(12) United States Patent
Woodall et al.

(10) Patent No.: US 8,396,322 B1
(45) Date of Patent: Mar. 12, 2013

(54) OPTICAL DISTORTION CORRECTION IN DIGITAL VIDEO PROCESSING APPLICATIONS

(75) Inventors: Neil D. Woodall, Newport Beach, CA (US); Carl Alelyunas, West Linn, OR (US); Minghui Yang, Shanghai (CN)

(73) Assignee: Pixelworks, Inc., Tualatin, OR (US)

( * ) Notice: Subject to any disclaimer, the term of this patent is extended or adjusted under 35 U.S.C. 154(b) by 1278 days.

(21) Appl. No.: 12/137,000

(22) Filed: Jun. 11, 2008

(51) Int. Cl.
*G06K 9/40* (2006.01)
*G06K 9/36* (2006.01)
*H04N 3/22* (2006.01)
*H04N 3/26* (2006.01)

(52) U.S. Cl. ............ 382/275; 382/277; 348/745
(58) Field of Classification Search ............ 382/277, 382/275; 348/745
See application file for complete search history.

(56) References Cited

U.S. PATENT DOCUMENTS

| | | | |
|---|---|---|---|
| 5,703,604 A * | 12/1997 | McCutchen | 345/8 |
| 6,367,933 B1 * | 4/2002 | Chen et al. | 353/69 |
| 7,729,600 B2 * | 6/2010 | Piersol et al. | 396/50 |
| 2004/0036844 A1 * | 2/2004 | Wood et al. | 353/70 |
| 2004/0130669 A1 * | 7/2004 | Shin et al. | 348/744 |
| 2005/0180655 A1 * | 8/2005 | Ohta et al. | 382/275 |
| 2005/0219472 A1 * | 10/2005 | Matsumoto | 353/69 |
| 2007/0153024 A1 * | 7/2007 | Miller | 345/660 |
| 2008/0193042 A1 * | 8/2008 | Masuda et al. | 382/275 |
| 2008/0232788 A1 * | 9/2008 | Piersol et al. | 396/50 |

* cited by examiner

*Primary Examiner* — Aaron W Carter
(74) *Attorney, Agent, or Firm* — Marger, Johnson & McCollom PC

(57) ABSTRACT

Methods for reducing optical distortion such as keystone distortion can include receiving an input image and modifying the input image by applying two separate 1D operations to the input image and applying a polyphase filter to the input image, where the first 1D operation is performed after application of the second 1D operation has begun. The modified image can then be projected.

10 Claims, 12 Drawing Sheets

OPTICAL DISTORTION CORRECTION IN DIGITAL VIDEO PROCESSING APPLICATIONS

TECHNICAL FIELD

The disclosed technology pertains to digital video processing applications, and more particularly to improved techniques for optical distortion correction such as keystone correction.

BACKGROUND

Projection systems are widely used in training, sales, and business environments. FIG. 1 shows one example of a projection system 100 that includes a projector 102 positioned on a horizontal surface 104. The surface 104 is typically a desk or tabletop. An elevator 120 protrudes from the bottom sides of the projector 102 creating an angle 110 between the surface 104 and the projector 102. Although only one elevator 120 is shown in FIG. 1 one of skill in the art should understand that a plurality of elevators 120 might be employed in the system 100. Likewise, a one of skill in the art should recognize that the projector 102 refers to any system capable of projecting any of a variety of still or moving images (e.g., projection televisions, multimedia projectors, and computer displays).

The angle 110 varies depending on the position of the elevator 120. The elevator 120 tilts the projector 102's position relative to the surface 104 such that projected image 118 moves up or down on a projection surface 114, increasing or decreasing the angle 110. The projection surface 114 might be a wall, screen, or any other surface capable of displaying a projected image 118.

In the example, the projector 102 manipulates image signals 108 that it receives from a computer 106. One of skill in the art should recognize that the projector 102 might receive different types of image signals (e.g., digital or analog signals) from the computer 106. The image signals 108 represent still, partial, or full motion images of the type rendered by the computer 106.

The projector 102 casts the image signals 108 onto the projection surface 114. The resulting projected image 118 centers about a projection axis 116. An angle 112 exists between the projection axis 116 and the projection surface 114. The angle 112 changes responsive to changes in the angle 110.

The projected image 118 is generally undistorted when the projection axis 116 is substantially perpendicular to the projection surface 114 (i.e., the angle 112 is 90 degrees). The projected image 118 typically distorts, however, when the projection axis 116 is not perpendicular to the projection surface 114. This optical distortion is known as keystone distortion because the image resulting from the misalignment appears more trapezoidal than square. For example, the jagged lined image 122 appears wider at the top than at the bottom. Such a distorted image is a distraction that most presenters would prefer to avoid.

Keystone correction typically adjusts for keystone distortion by adding a special, selectable algorithm to the scaling, thereby allowing the image to be altered before it reaches the projection lens. The result is a projected image that is properly squared, even if it is projected at an angle. This allows presenters more flexibility when setting up their projector in variable environments, for example. Keystone correction has two main types: vertical keystone correction and horizontal keystone correction. In the case of CRT projectors, keystone correction is typically provided by changing signals to the horizontal and vertical deflection circuits.

One way to correct optical distortion such as keystone distortion is to perform an image warping operation. Traditionally, image warping is performed by using either a forward address mapping approach or a reverse address mapping approach. In a typical forward address mapping approach, each pixel in a source image is mapped to an appropriate place in the destination image. The reverse address mapping approach involves going through each pixel in the destination image and sampling an appropriate source image pixel.

Forward address mapping approaches are generally more desirable than reverse address mapping approaches because the memory bandwidth requirements only increase when zooming a portion of the image, whereas reverse address mapping approaches typically require increased memory bandwidth when shrinking the image. Since keystoning and warping applications typically require shrinking the majority of the image, a forward address mapping approach would be preferable over a reverse address mapping approach from a cost standpoint. However, existing forward address mapping approaches have at least one undesirable drawback: significant difficulty in ensuring that new information is generated for all of the output pixels.

Another limitation of previous approaches is that the mapping algorithms are usually based on interpolation and interpolation does not address two image quality concerns with correcting optical distortion with fixed pixel imagers: illumination uniformity and variable anti-alias filtering requirements.

Accordingly, a need remains for improved keystone and optical distortion correction.

SUMMARY

The disclosed technology includes various techniques for improved keystone and optical distortion correction in digital video processing applications such as image projection.

In one embodiment of the disclosed technology, an image projection system includes a receiver, a video image controller, and a projector. The receiver receives an input image from an external source (e.g., a personal computer), where the input image has an optical distortion such as a keystone distortion. The controller generates an inverse optical distortion to correct for the optical distortion of the input image and applies the generated inverse optical distortion to generate an output image. That is, starting with the correct picture at the projection screen, the optical transfer function is applied to map the picture onto the plane of the projector's imaging device. The projector then projects the output image, which corresponds to the input image but without the original optical distortion of the input image.

The video image controller generates the inverse optical distortion by applying two separate 1D processes to the input image, for example. The separate 1D processes can include a horizontal scaling operation and a vertical scaling operation. In some embodiments, the vertical scaling operation is applied after the horizontal scaling operation has begun but before the horizontal scaling operation has completed. The video image controller can include a horizontal accumulator to perform horizontal accumulation. The video image controller can also include a vertical accumulator to perform vertical accumulation.

In certain embodiments, the video image controller can apply a polyphase filter to the input image. The image projection system can include a memory to buffer and store output image data (e.g., a final projected image).

In certain embodiments, pixels at a plane of projection are assumed to have a finite size (in contrast to interpolation algorithms, which typically assume that the pixels are infinitely small relative to their spacing). For example, pixel size can be assumed to be equal to pixel spacing (i.e., 100% fill factor). When an inverse optical transform is applied, pixels representing an input picture generally map to more than one imager pixel, and one imager pixel generally maps to more than one picture pixel. Thus, the disclosed technology provides for dividing the value of the picture pixels to the multiple imager pixels and summing up contributions from the picture pixels to a given imager pixel.

The foregoing and other features, objects, and advantages of the invention will become more readily apparent from the following detailed description, which proceeds with reference to the accompanying drawings.

DETAILED DESCRIPTION

Figure 1:
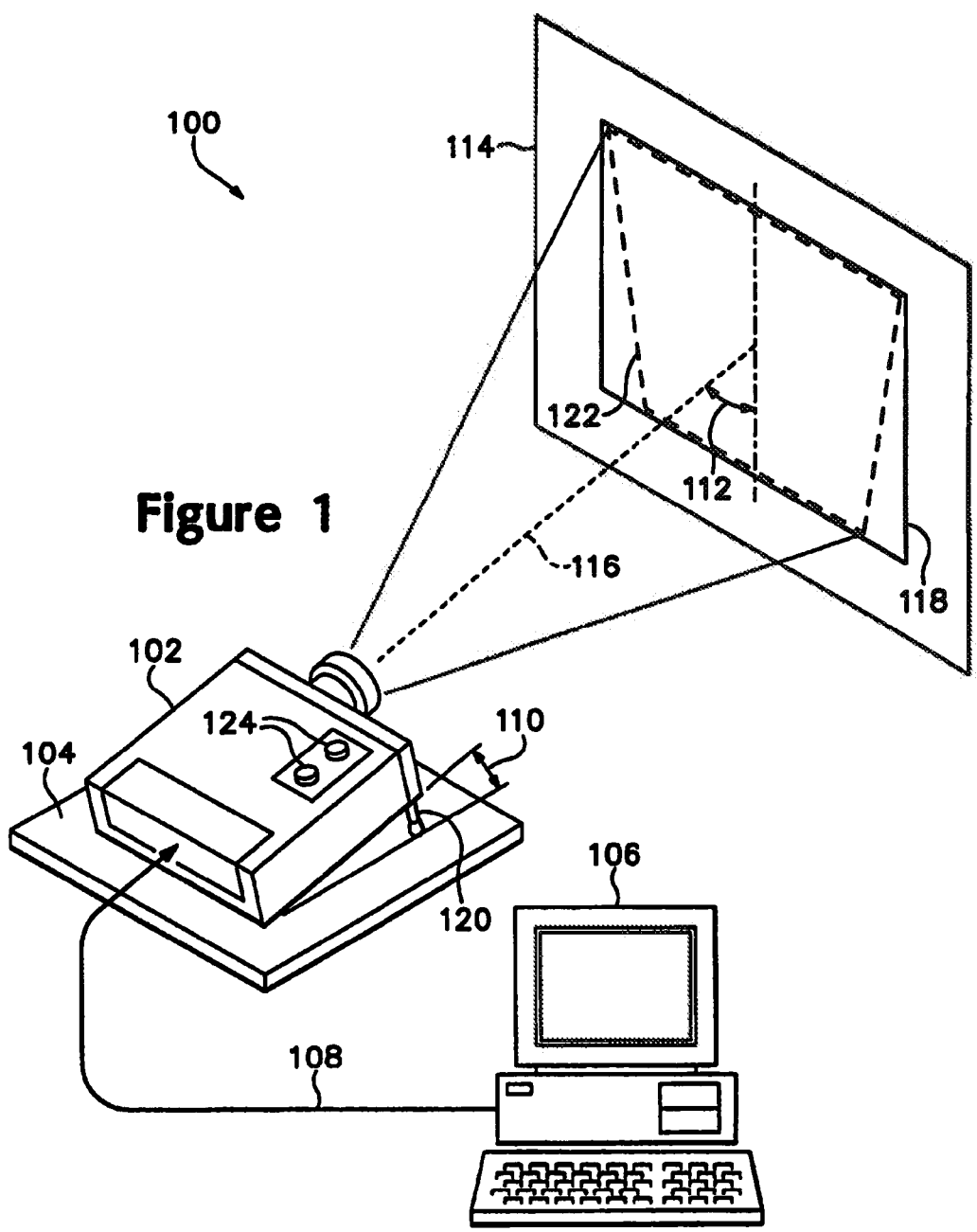
FIG. 1 shows an exemplary projector system.
Figure 2:
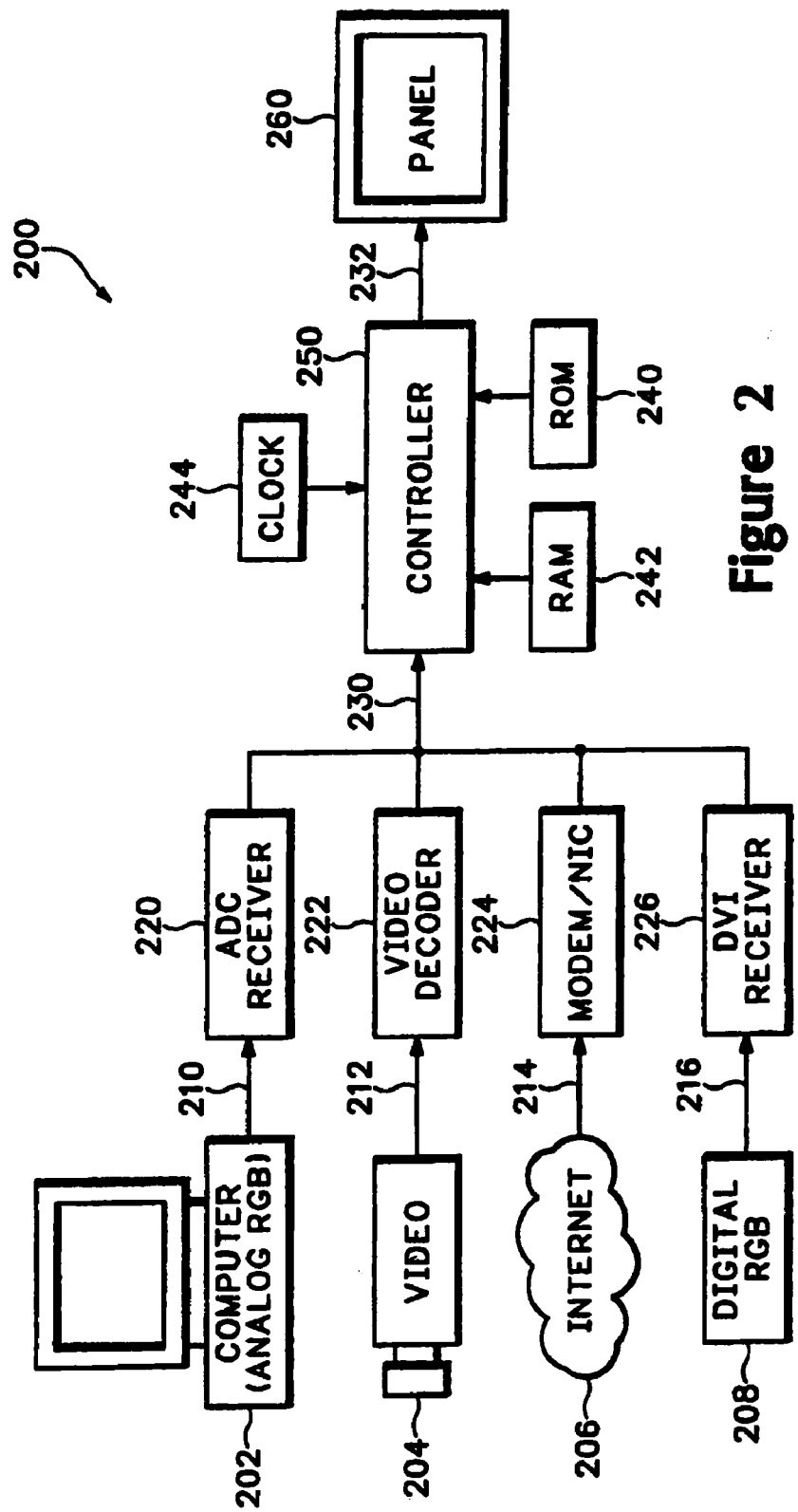
FIG. 2 shows an exemplary projector system implementing one of more techniques of the disclosed technology.

FIG. 2 is a block diagram of a projection system 200 according to embodiments of the disclosed technology. Referring to FIG. 1, the projection system 200 of FIG. 2 is capable of projecting an image 118 on a projection surface 114. The projection system 200 includes a receiver 220 for receiving an analog image data signal 210 (e.g., an RGB signal) from a source 202. The receiver 220 might be an analog-to-digital converter (ADC) or the like. The source 202 might be a personal computer or the like. The receiver 220 converts the analog image data signal 210 into digital image data 230 and provides it to the panel controller 250.

Likewise, a video receiver or decoder 222 decodes an analog video signal 212 from a video source 204. The video source 204 might be a video camcorder and the like. The decoder 222 converts the analog video signal 212 into digital image data 230 and provides it to the panel controller 250.

A modem or network interface card (NIC) 224 receives digital data 214 from a global computer network 206 such as the Internet. The modem 224 provides digital image data 230 to the panel controller 250.

A Digital Visual Interface (DVI) receiver 226 receives digital RGB signals 216 from a digital RGB source 208. The DVI receiver 226 provides digital image data 230 to the panel controller 250.

One of skill in the art should recognize other sources and other converters come within the scope of the present invention.

In the example, the panel controller 250 generates panel data 232 by manipulating the digital image data 230. The panel controller 250 provides the panel data 232 to a flat panel device 260. The panel 260 is any device capable of projecting the digital image data 230. In one embodiment, the panel 260 includes a pixelated display that has a fixed pixel structure together with the optics and electronics necessary to project the digital image data 232 on a surface 114 (see FIG. 1). Examples of pixelated displays are active and passive LCD displays, plasma displays (PDP), field emissive displays (FED), electro-luminescent (EL) displays, micro-mirror technology displays, low temperature polysilicon (LTPS) displays, and the like for use in television, monitor, projector, hand-held, and other like applications.

In one embodiment, the panel controller 250 might scale the digital image data 230 for proper projection by the panel 260 using a variety of techniques including pixel replication, spatial and temporal interpolation, digital signal filtering and processing, and the like. In another embodiment, the controller 250 might additionally change the resolution of the digital image data 230, changing the frame rate and/or pixel rate encoded in the digital image data 230. Scaling, resolution, frame, and/or pixel rate conversion, and/or color manipulation are not central to this invention and are not discussed in further detail. One of skill in the art should recognize that the controller 250 manipulates the digital image data 230 and provides panel data 232 to a panel 260 that is capable of properly projecting a high-quality image regardless of display type.

Read-only (ROM) and random access (RAM) memories 240 and 242, respectively, are coupled to the display system controller 250 and store bitmaps, FIR filter coefficients, and the like. One of skill in the art should recognize that the ROM and RAM memories 240 and 242, respectively, might be of any type or size depending on the application, cost, and other system constraints. A person of reasonable skill in the art should recognize that the ROM and RAM memories 240 and 242 might not be included in the system 200. One of skill in the art should recognize that the ROM and RAM memories 240 and 242 might be external or internal to the controller 250. Clock 244 controls timing associated with various operations of the controller 250. One of skill in the art should recognize that the projector 102 might house all or part of the controller 250, clock 244, RAM 242, ROM 240, panel 260, as well as the optics and electronics necessary to project the panel data 232.

Embodiments of the disclosed technology involve generating the inverse of the optical distortion to an input image. The inverse optical distortion will desirably include both changes to the geometry and changes to the brightness, and assumes that pixels at a plane of projection have a finite size (e.g., represent a 100% fill factor). In other words, each of the pixels can be modeled as having a finite size. The input picture is mapped to the actual display device, and the distorted pixels caused by the mapping are then used to determine how much of each picture pixel should be mapped to each display device pixel. Applying the inverse optical transform, the pixels representing the input picture will desirably map to more than one imager pixel, and one imager pixel will desirably map to more than one picture pixel. Thus, certain embodiments will divide the value of picture pixels to multiple imager pixels and sum up contributions from the picture pixels to a given imager pixel.

Figure 3:
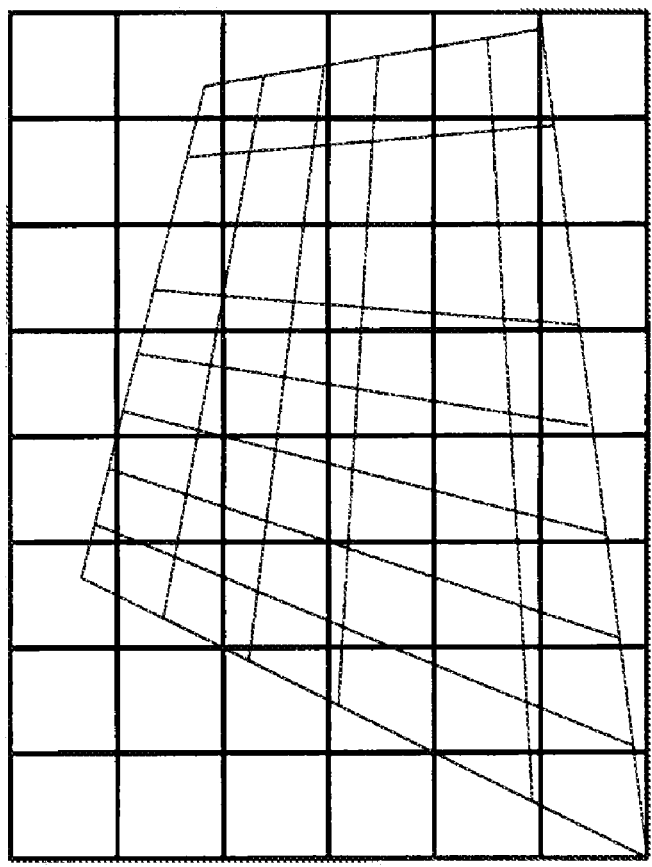
FIG. 3 shows an exemplary mapping of a picture to a display device.
Figure 4:
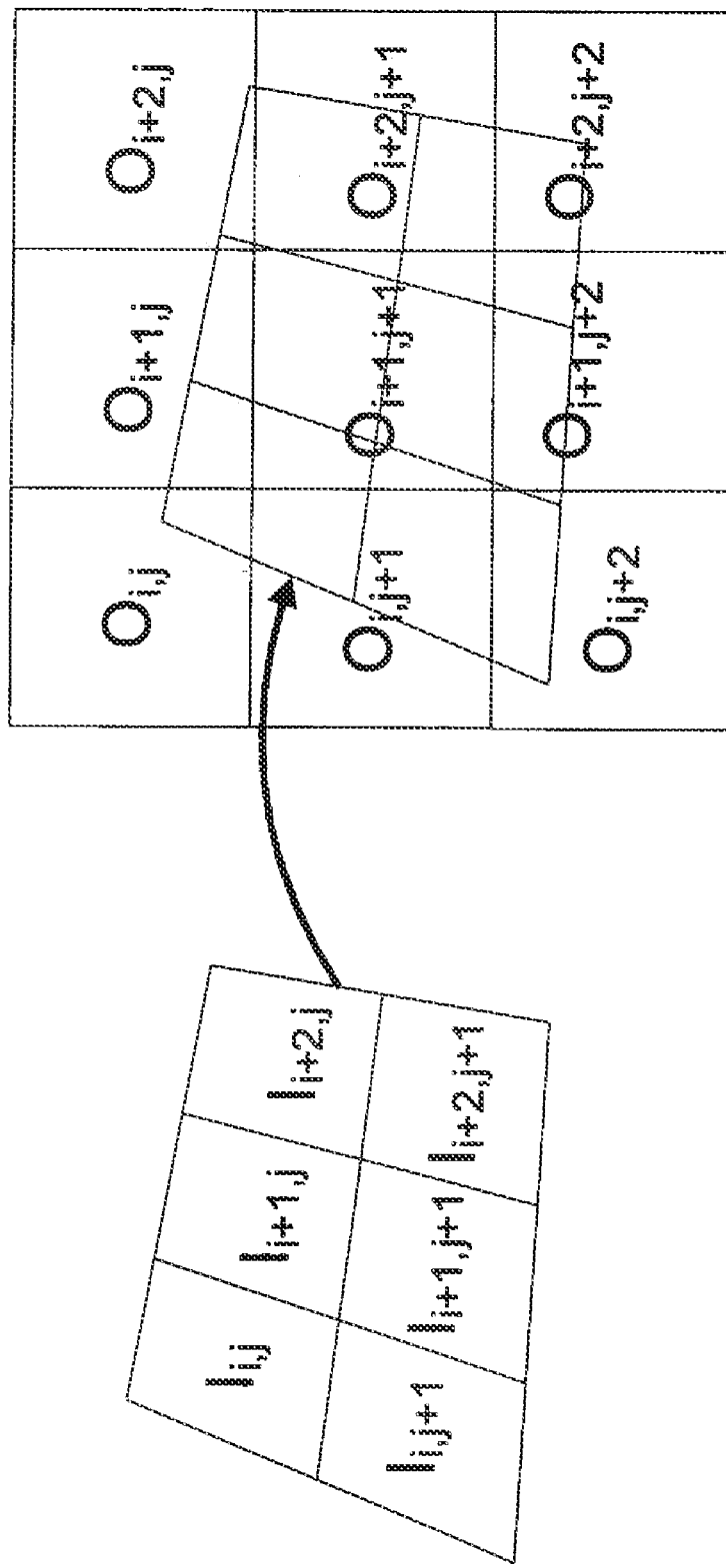
FIG. 4 shows a more detailed view of the exemplary mapping of the picture to the display device shown in FIG. 3.

FIG. 3 shows an exemplary mapping of an input picture to the actual display device. FIG. 4 shows a more detailed view of the exemplary mapping of the picture to the display device shown in FIG. 3. In the example, an individual display pixel (O) is calculated from the picture pixel (I) using the following formula:

$$O_{i+1,j+1} w1*I_{i,j} + w2*I_{i+2,j} w4*I_{i,j+1} + w5*I_{i+1,j+1} w6*I_{i+2,j+1}$$

where:
w1=percent of $L_{i,j}$ that overlaps $O_{i+1,j+1}$
w2=percent of that overlaps $O_{i+1,j+1}$
w3=percent of $I_{i+2,j}$ that overlaps $O_{i+1,j+1}$
w4=percent of $I_{i,j+1}$ that overlaps $O_{i+1,j+1}$
w5=percent of $I_{i+1,j+1}$ that overlaps $O_{i+1,j+1}$
w6=percent of $I_{i+2,j+1}$ that overlaps $O_{i+1,j+1}$
and $SW_{i+1,j+1}$=w1+w2+w3+w4+w5+w6>1.

In embodiments where $SW_{i+1,j+1}$ is larger than 1, the brightness for the display pixel will be larger than that of the input picture pixel. This is done to desirably achieve uniform brightness after projection of the display pixel because that display pixel will cover a larger area of the screen.

Because the determination of each weighting factor is non-trivial and computation-intensive, a further aspect of the disclosed technology is that in certain embodiments the process can be broken down into two 1D mappings as described below.

Figure 5A:
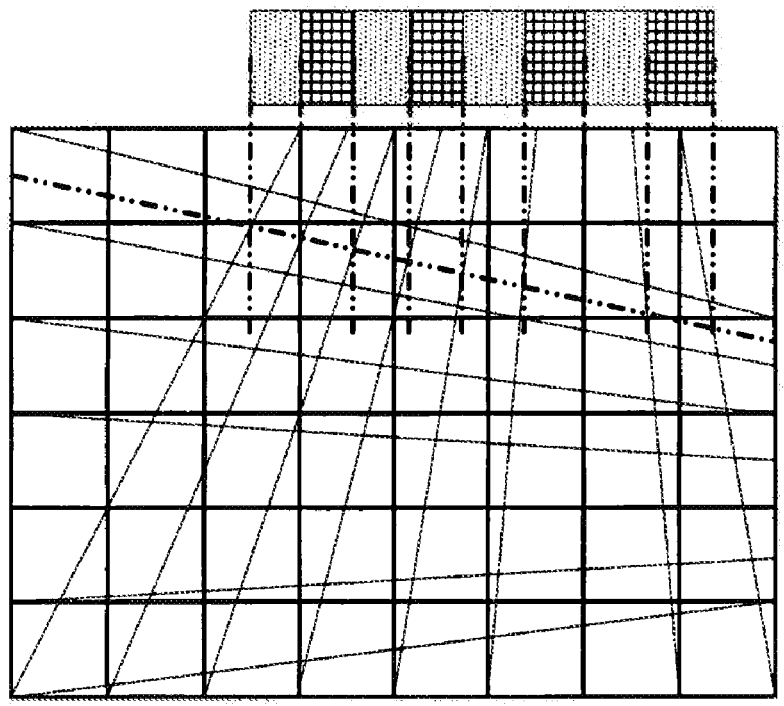
FIG. 5A shows a horizontal distortion calculation that includes a determination of the horizontal position of each pixel in the picture of FIGS. 3 and 4 according to embodiments of the disclosed technology.
Figure 5B:
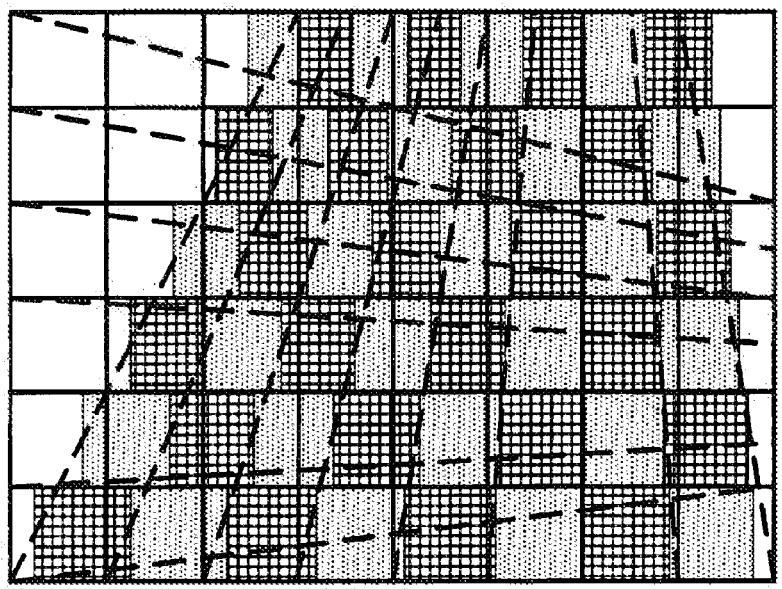
FIG. 5B shows an approximation of what the entire frame from FIG. 5A would look like after the horizontal scaling has been applied according to embodiments of the disclosed technology.

First, the horizontal distortion required for each line is calculated. The horizontal position of each pixel is determined by the 2D calculation as illustrated in FIG. 5A. FIG. 5B shows an approximation of what the entire frame from FIG. 5A would look like after the horizontal scaling has been applied according to described embodiments.

Figure 6:
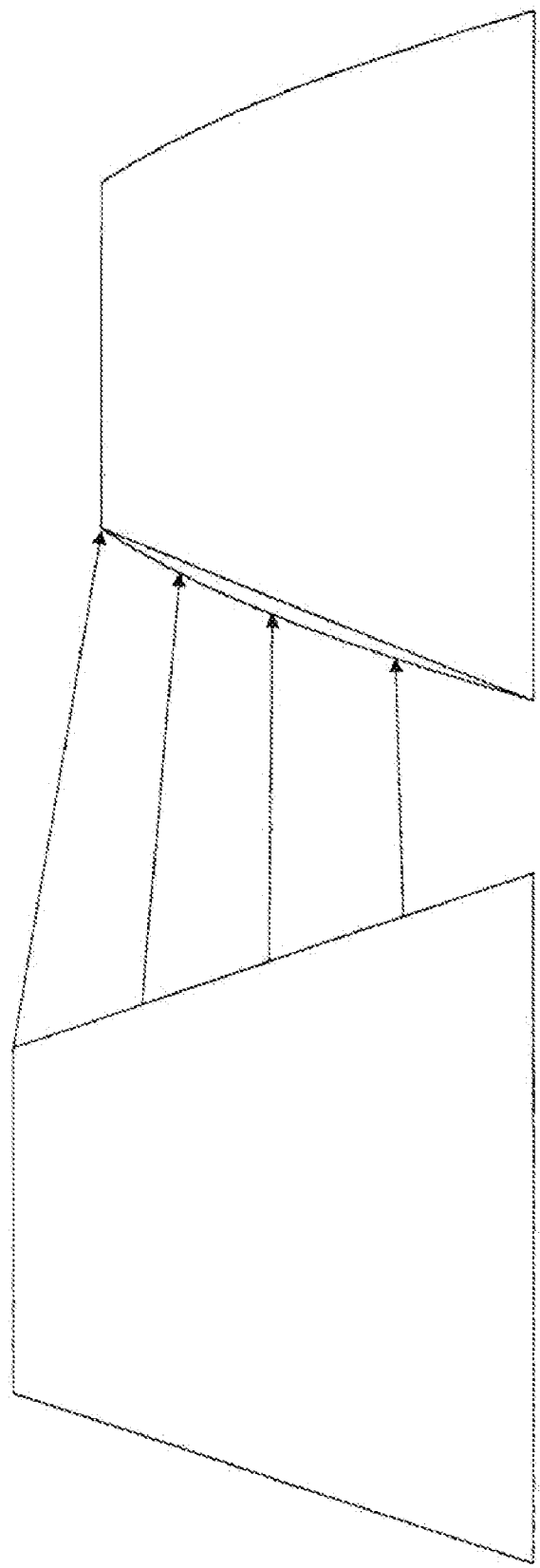
FIG. 6 shows the effect of using traditional keystone applications that only include vertical scaling.

The horizontal scaling is desirably controlled using the positions of the pixels in the horizontal direction in the final 2D mapping, which is something not done by traditional keystone correction methods. Rather, traditional keystone correction methods often use a simplification in which the keystone algorithm is first applied to either a vertical or horizontal scalar, and then a similar keystone algorithm is applied in the other scaling direction, which results in an image that has curved lines when projected. FIG. 6 shows an example of what happens when only vertical keystone correction is applied in the traditional manner.

Figure 7:
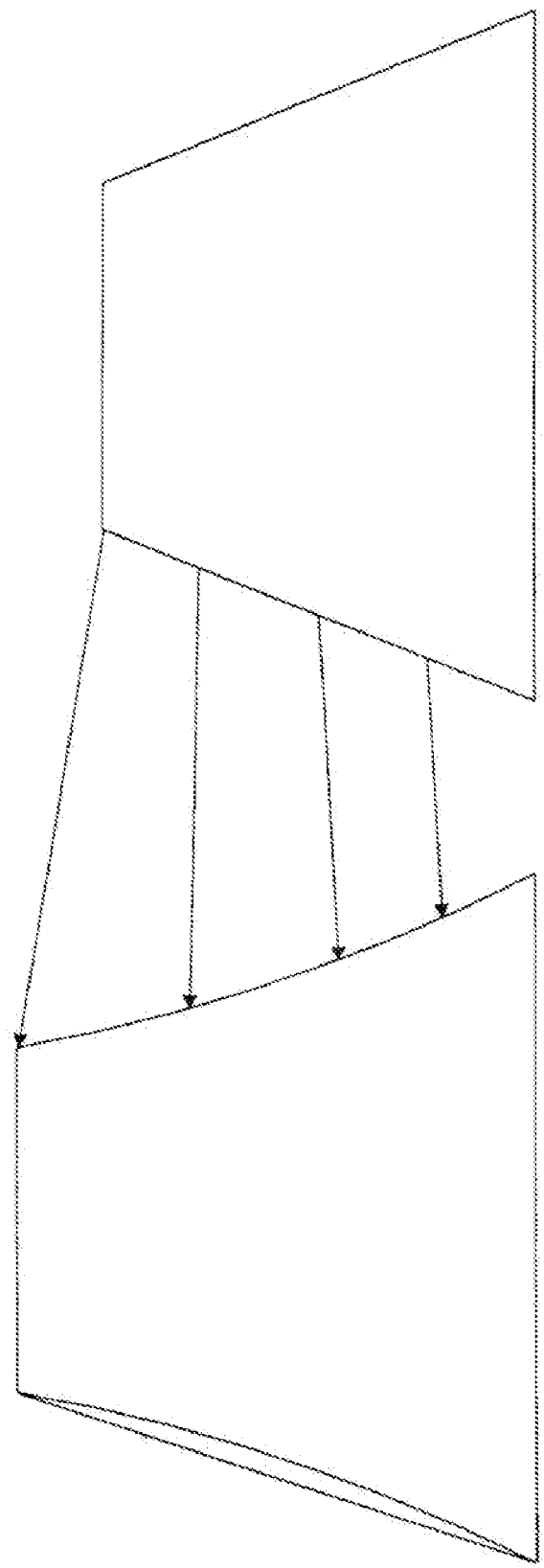
FIG. 7 shows one example of a final result of performing horizontal scaling and vertical scaling according to embodiments of the disclosed technology.

In the example shown in FIG. 7, the edges do not appear to be straight after vertical scaling has been applied. This is because the horizontal position is determined by the 2D mapping, which is not linear and is more complicated to calculate.

Figure 8:
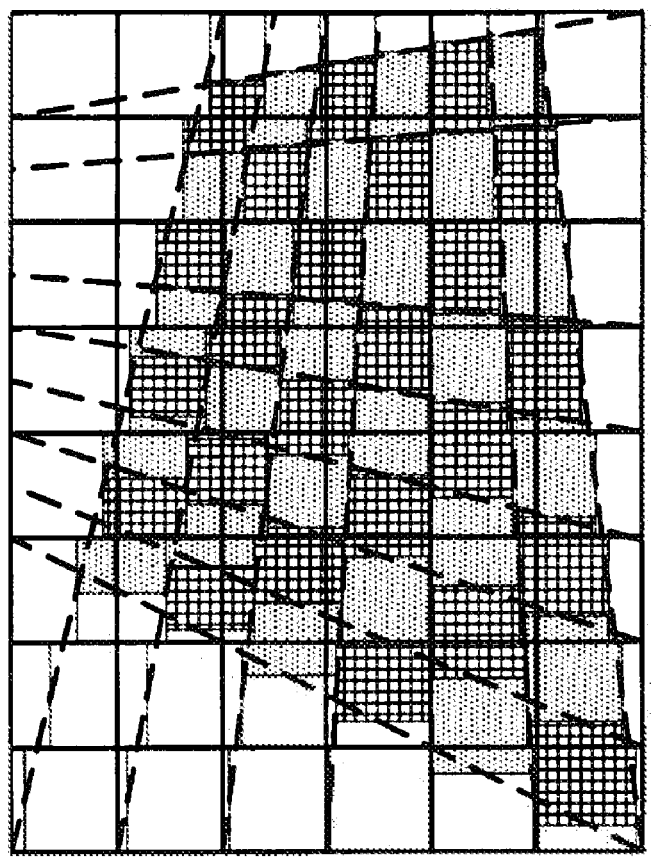
FIG. 8 shows one example of a final result after separate 1D processing according to embodiments of the disclosed technology.

FIG. 8 shows one example of a final result after separate 1D processing according to embodiments of the disclosed technology. In the example, scaling in the vertical direction can begin after only a few lines of the image are processed in the horizontal direction. For this scaling, however, the original 2D mapping is not used. Rather, the mapping to use is the mapping that is correct for the center of each column of the display device. These coordinates can be found by linear interpolation of the original 2D data, for example.

While the separate 1D processing may have errors, the overall shape of each of the pixels is very close to the 2D map. These errors may be larger for extreme keystone angles, but they are not significant when compared to the unavoidable moiré and aliasing errors in any known interpolation algorithm.

The exemplary process described above could still result in less than desirable image quality because the process described is equivalent to linear interpolation in the 1D process and similar to bi-linear interpolation for the 2D process. So, in order to improve the image quality, an algorithm is provided that is closer to the polyphase filtering typically used by scaling algorithms. This improvement can be achieved by convoluting the input data with a filter that changes based on phase. In the example, the phase is related to the center of the picture pixel relative to the center of the display pixel.

For example, consider the filter response required for a 4 tap interpolation filter when the phase is 0.5. Typically, the result can be found using the following equation:

$$O_i = (-I_{i-1} + 9*I_i + 9*I_{i+1} - I_{i+2})/16,$$

which could also be written as:

$$O = [-1, 9, 9, -1]*I/16.$$

What the 1D process provides is the following:

$$O = [1, 1]*I/2$$

It is desirable to apply a filter to I so that, after the linear interpolation is applied, the 4 tap result is achieved. If a filter of [−1 10 −1]/8 is applied first, the linear interpolation will result in the following filter:

$$[-1, (10-1), (-1+10), -1]/8/2 = [-1, 9, 9, -1]/16.$$

This filter cannot be applied all the time, however. If it was, a zero phase would result in the input not being passed unchanged to the output, but rather sharpened. So, for a zero phase, no filter or a little low pass filter is desirably applied to achieve a closer match to the 0.5 phase frequency response. Therefore, each phase typically requires a different pre-compensation filter to approximate an ideal polyphase filter.

Thus, embodiments of the disclosed technology can provide scaling by use of a polyphase filter followed by a linear interpolation stage. For variable scaling, the linear interpolation stage can be replaced with an algorithm that mimics a convolution of the sampled input data onto a different sample rate of the output.

Figure 9:
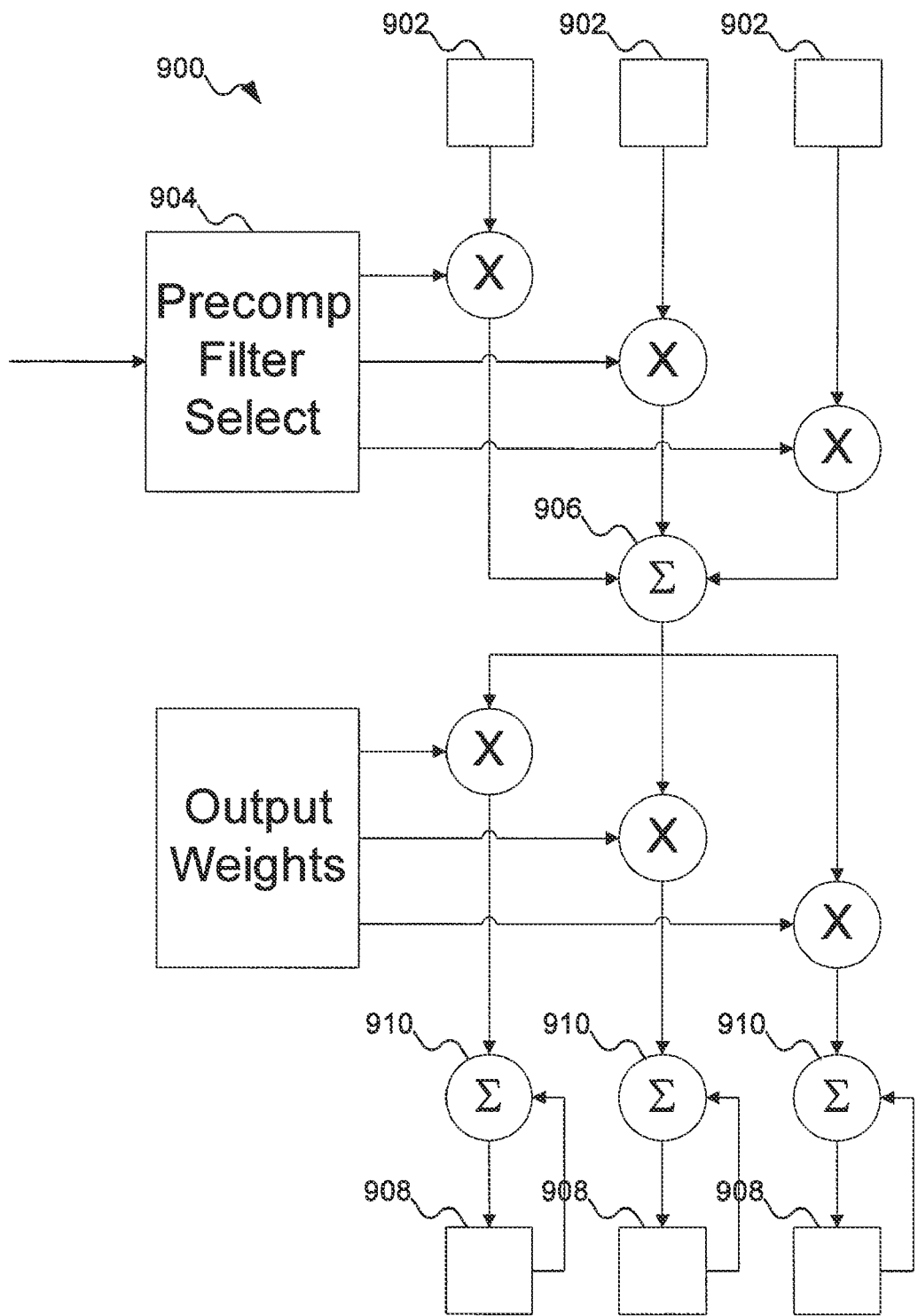
FIG. 9 shows an exemplary data flow according to embodiments of the disclosed technology.

FIG. 9 shows an exemplary data flow 900 according to embodiments of the disclosed technology having a pre-compensation filter applied. Several input pixels 902 have a pre-compensation filter 904 applied to them. The coefficients can be determined by the phase of the input pixel to the output pixel. The results are summed together to generate a modified version 906 of the original input pixel. This modified version 906 is then divided up into several output pixels 908 depending on the overlap of the distorted input pixels on the output pixels. In the example, each of the different output pixels 908 is accumulated 910 with any previous results for those output pixels 908. The accumulation process desirably results in a variable low pass filter being applied to the input data.

Figure 10:
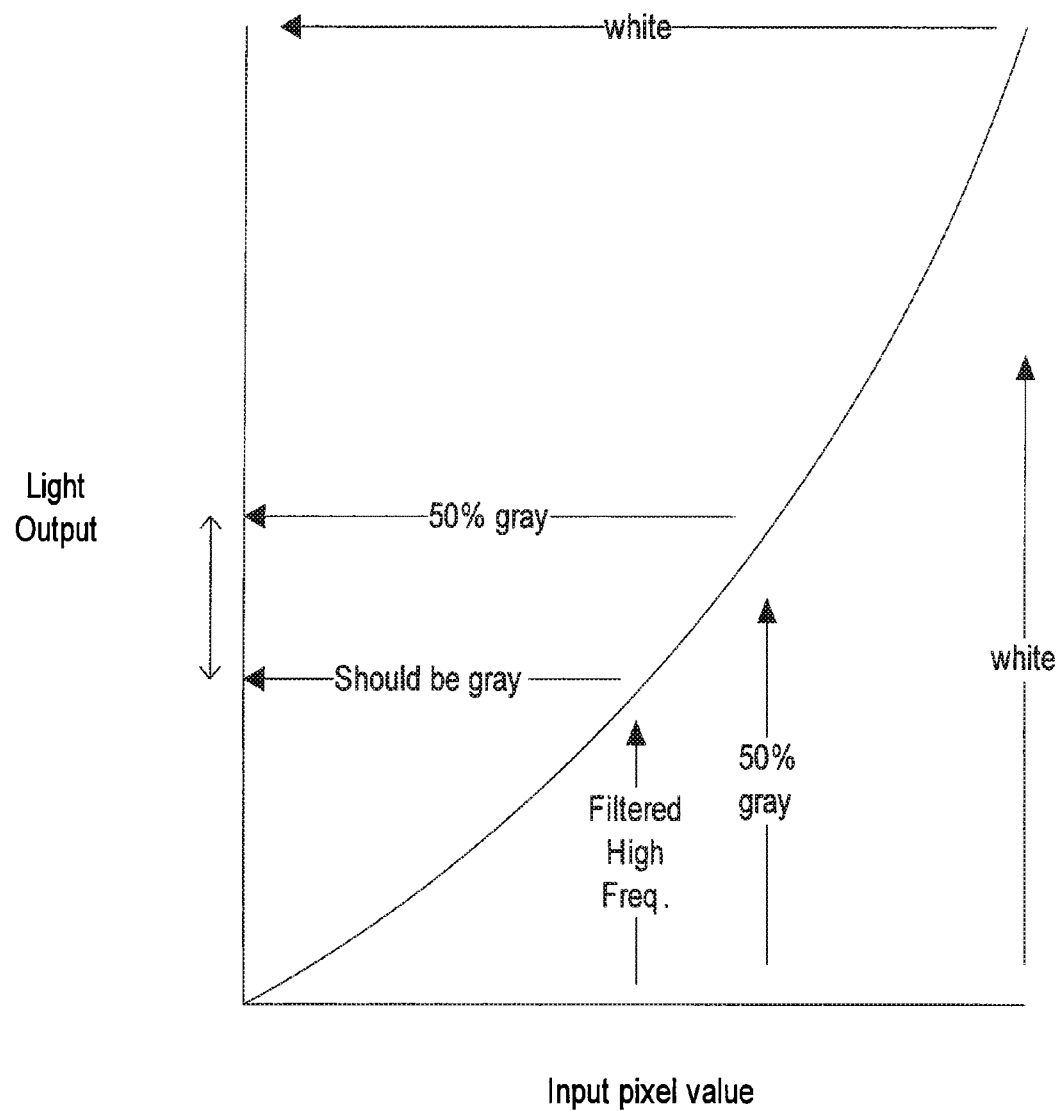
FIG. 10 is a graph illustrating the advantageous reduction in moiré effects resulting from implementation of embodiments of the disclosed technology.

Embodiments of the disclosed technology apply keystone correction after converting non-linear RGB data that is typically transmitted to linear RGB data. Applying this conversion before keystone correction desirably results in reduced moiré effects (e.g., low frequency light/dark bands that occur on top of the high frequency data), as shown in FIG. 10.

The optical convolution process mimicked by embodiments of the disclosed technology described above is a low pass filter operation. As the amount that an input picture needs to shrink when mapping to the display device increases, a more aggressive low pass filter operation naturally results. This occurs automatically so that different portions of the image can have different frequency responses, thereby reducing the amount of aliasing that occurs. However, since this may not be aggressive enough for all situations, the variable filtering can be further improved such that the algorithm can optionally include a pre-filter whose frequency response is controlled by the scaling of the input pixels.

The optical convolution method of described embodiments provides various other advantages, such as the effective elimination of ambiguity with respect to mapping input (e.g., picture pixels) to device pixels. Also, embodiments implementing the described algorithm desirably allow any warping of the image to be broken down into two separable 1D calculations as described above, thereby significantly decreasing the cost of the operation.

Figure 11:
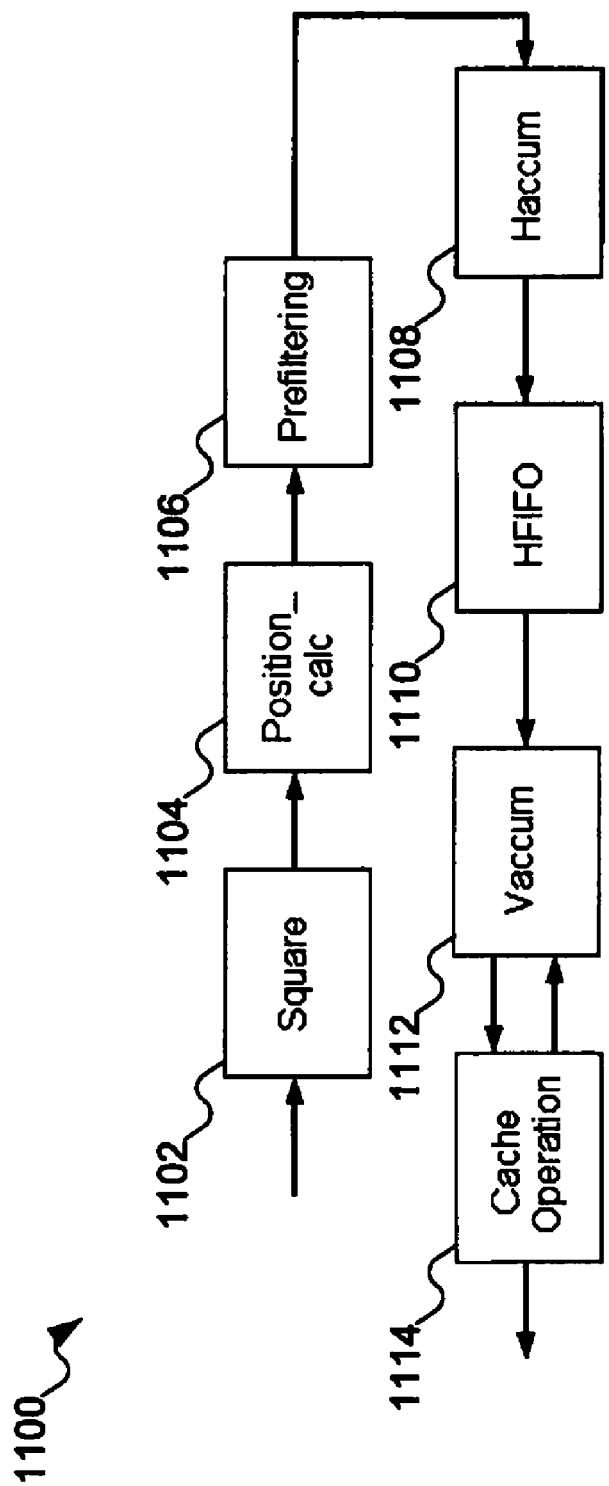
FIG. 11 shows an exemplary embodiment of a keystone correction module according to the disclosed technology.

FIG. 11 shows an exemplary embodiment of a keystone correction module 1100 that uses projective mapping to calculate the position of each pixel in an input image after keystone correction. This pixel position calculation is accurate and not merely an approximation. Also, the keystone correction module 1100 has various advantageous features, such as no curvature issue, reduced moiré, linearity of the projected image, less roping, and no missing pixel/line issues. The keystone correction module 1100 provides significantly improved keystone correction performance and can also be used for small pincushion/barrel correction.

Generally, the keystone correction module 1100 accepts input image data from an image capture block, processes the input image data, and outputs the processed image data to a memory. There are two kinds of filter that can be implemented with the keystone correction module 1100: a sharpness control filter (e.g., pixel based) and a de-moiré filter. The keystone correction module 1100 desirably can perform keystone correction up to about 45H/45V degree for XGA and WXGA inputs, and up to about 30H/30V degree for 1080P input. The actual limits to keystone correction performance are typically determined by the block size in the cache memory and the bandwidth of the external memory. For greater precision, the keystone correction module 1100 can support 16-bit processing.

The exemplary keystone correction module 1100 includes a squaring block 1102, a position calculation block 1104, a pre-filtering block 1106, a horizontal accumulator 1108, an HFIFO block 1110, a vertical accumulator 1112, and a cache operation block 1114.

The squaring block 1102 can be used to make an RGB input into linear space. For example, assuming the input space is "y=x^0.45" and adding an approximate gamma of 2 for the RGB, the keystone correction module 1100 is effectively made to operate in linear RGB space. In alternative embodiments where the input signal is in linear RGB, the squaring block 1102 can be disabled. A register INPUT SQUARING can be used to enable this function (e.g., when the value of the register is 1).

The position calculation block 1104 can be used to calculate a pixel's (x, y) coordinates after keystone correction. An exemplary projective mapping has 8 degrees of freedom that can be determined from coordinates of the 4 corners of a source quadrilateral and the 4 corners of the destination quadrilateral. The example lets the correspondence map $(u_k, v_k)^T$ to $(x_k, y_k)^T$ or vertices numbered cyclically k=0, 1, 2, 3, where all coordinates are assumed to be real (finite). To compute a forward mapping matrix $M_{sd}$ (assuming i=1), there are 8 equations in the 8 unknowns a-h:

$$x_k = \frac{au_k + bv_k + c}{gu_k + hv_k + 1} \Rightarrow u_k a + v_k b + c - u_k x_k g - v_k x_k h = x_k$$

$$y_k = \frac{du_k + ev_k + f}{gu_k + hv_k + 1} \Rightarrow u_k d + v_k e + f - u_k y_k g - v_k y_k h = y_k$$

for k=0, 1, 2, 3, which can be rewritten as the following 8×8 system:

$$\begin{pmatrix} u_0 & v_0 & 1 & 0 & 0 & 0 & -u_0 x_0 & -v_0 x_0 \\ u_1 & v_1 & 1 & 0 & 0 & 0 & -u_1 x_1 & -v_1 x_1 \\ u_2 & v_2 & 1 & 0 & 0 & 0 & -u_2 x_2 & -v_2 x_2 \\ u_3 & v_3 & 1 & 0 & 0 & 0 & -u_3 x_3 & -v_3 x_3 \\ 0 & 0 & 0 & u_0 & v_0 & 1 & -u_0 y_0 & -v_0 y_0 \\ 0 & 0 & 0 & u_1 & v_1 & 1 & -u_1 y_1 & -v_1 y_1 \\ 0 & 0 & 0 & u_2 & v_2 & 1 & -u_2 y_2 & -v_2 y_2 \\ 0 & 0 & 0 & u_3 & v_3 & 1 & -u_3 y_3 & -v_3 y_3 \end{pmatrix} \begin{pmatrix} a \\ b \\ c \\ d \\ e \\ f \\ g \\ h \end{pmatrix} = \begin{pmatrix} x_0 \\ x_1 \\ x_2 \\ x_3 \\ y_0 \\ y_1 \\ y_2 \\ y_3 \end{pmatrix}$$

The position calculation block 1104 can include keystone and pincushion/barrel coordinates calculations, and it can calculate a minimal scaling ratio at x and y direction for brightness normalization. An exemplary keystone coordinates calculation uses 8 coefficients to calculate every pixel's position. Thus, the software can provide the 8 coefficients that are calculated from the 4 corner coordinates and save them to registers (e.g., COEF_A to COEF_H registers).

Additionally, a pincushion/barrel coordinates calculation can be used to perform pincushion/barrel correction in order to address any lens distortion present. The exemplary registers below can be used to control the pincushion/barrel correction:

XPINCXOFFSET: specifies when to do pincushion correction in x direction, the offset in x direction for pincushion center.

XPINCYOFFSET: specifies when to do pincushion correction in x direction, the offset in y direction for pincushion center.

YPINCXOFFSET: specifies when to do pincushion correction in y direction, the offset in x direction for pincushion center.

YPINCYOFFSET: specifies when to do pincushion correction in y direction, the offset in y direction for pincushion center.

XPINCGAIN: specifies when to do pincushion correction in x direction, the pincushion gain (e.g., when XPINCGAIN<0, barrel correction; when XPINCGAIN>0, pincushion correction; when XPINCGAIN=0, no pincushion correction).

YPINCGAIN: specifies when to do pincushion correction in y direction, the pincushion gain (e.g., when YPINCGAIN<0, barrel correction; when YPINCGAIN>0, pincushion correction; when YPINCGAIN=0, no pincushion correction.

When XPINCGAIN=0 and YPINCGAIN=0, this module is pass through without pincushion correction.

The following two exemplary registers (XSHIFT and YSHIFT) can be calculated and used to keep the pincushion result in the whole image:

$$XSHIFT=XPINCGAIN>0?\max((Height-XPINCYOFFSET)^2, XPINCYOFFSET^2):0$$

$$YSHIFT=YPINCGAIN>0?\max((Width-YPINCXOFFSET)^2, YPINCXOFFSET^2):0$$

A minimal scaling ratio calculation can be used to calculate the minimal scaling ratio at x and y directions (e.g., xminsize and yminsize) in the current frame. Additional registers (e.g., MINHSIZE and MINVSIZE) can also be used for xminsize and yminsize. The position calculation block 1104 can calculate xminsize and yminsize by 4 corners coordinates and write them to registers (e.g., MINHSIZE and MINVSIZE). The position calculation block 1104 desirably selects the minimum one to be used in a brightness normalization function.

In an exemplary brightness normalization operation, the position calculation block 1104 needs to know each pixel's xsize and ysize for adaptive H/V filtering. However, only xsize has been calculated. So there are two other registers (KAVG and BAVG) that can be used. The position calculation block 1104 can use the following function to calculate ysize approximately:

$$ysize=KAVG*xsize+BAVG.$$

The pre-filtering block 1106 can be used for anti-alias and sharpness tuning, which are pixel-adaptive with size. In certain embodiments, the adaptive filter is a 4-tap, low-pass filter that can be calculated from two filters: a sharp filter and a soft filter. The output of the sharp and soft filters can be merged together based on the scaling ratio pixel by pixel. For example, in the x direction, the 4-tap $$Parm_i = (1 - xsize\_temp) * Parm_{soft} + xsize\_temp * Parm_{sharp},$$

$$xsize\_temp = 1 - pre\_blend\_factor * (1 - xsize)$$

depends on the xsize and PRE_BLEND_FACTOR register. When xsize is larger, $Parm_i$ tends to select $Parm_{sharp}$, whereas when xsize is smaller, $Parm_i$ tends to select $Parm_{soft}$. When PRE_BLEND_FACTOR is larger, $Parm_i$ tends to select $Parm_{soft}$, whereas when PRE_BLEND_FACTOR is smaller, $Parm_i$ tends to select $Parm_{sharp}$. Because these exemplary filter coefficients can be affected by xsize, the input filters don't need change when the keystone angle changes.

The following can be used when the y direction is the same as x direction:

$$R = \sum_{i=0}^{3}\left(Parm_i \sum_{j=0}^{3}(Parm_j * cacheR[i][j])\right)$$

$$G = \sum_{i=0}^{3}\left(Parm_i \sum_{j=0}^{3}(Parm_j * cacheG[i][j])\right)$$

$$B = \sum_{i=0}^{3}\left(Parm_i \sum_{j=0}^{3}(Parm_j * cacheB[i][j])\right)$$

The following exemplary registers can be used as indicated:
PREFILTER_EN (a value of 1 can enable prefiltering).
ADAPT_PRE_EN (a value of 1 can enable adaptive prefiltering, and a value of 0 can disable adaptive prefiltering).

The horizontal accumulation block 1108 (Haccum) can be used to perform horizontal pre-compensation filtering and horizontal accumulation by implementing the pixel accumulation in horizontal scaling.

The horizontal accumulation block 1108 can include a horizontal pre-compensation filter used to perform a de-moiré operation in the horizontal direction. The filter coefficients can be set by registers. In the example, the filter is 64 phases, 3-tap symmetric, and there are 128 coefficients totally.

The following exemplary registers can be used as indicated:
PRECOMP_EN (a value of 1 can enable pre-compensation filtering).
NORMBLEND_FACTOR can be used to modify the percentage to balance the brightness between zoom area and shrink area (e.g., a value of 0 means no brightness normalization, whereas a value of 16 means total brightness normalization).

Figure 12:
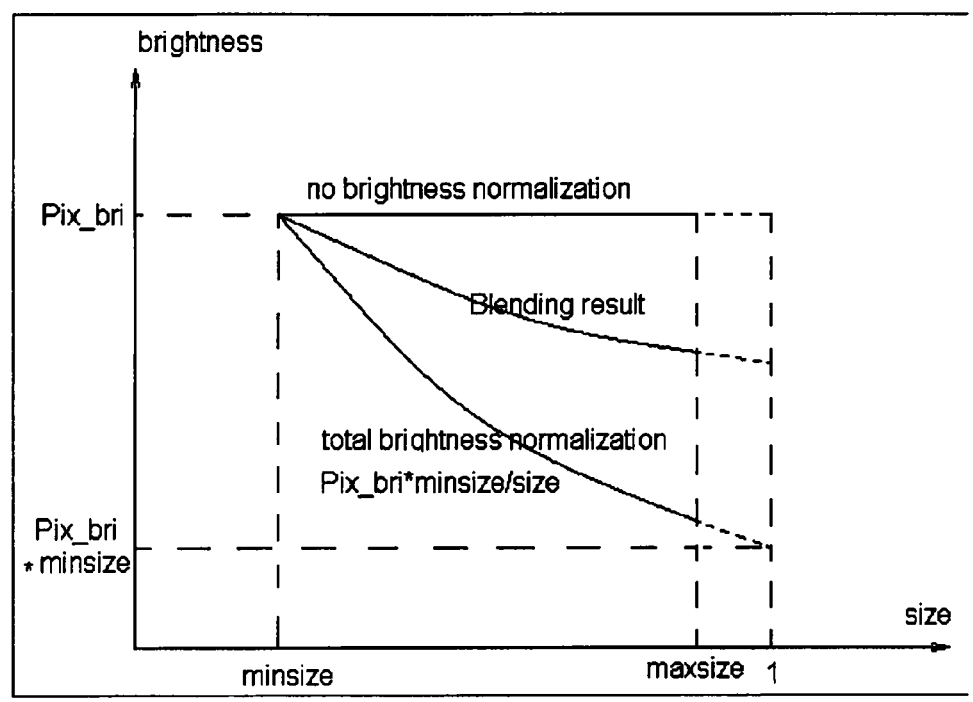
FIG. 12 is a graph illustrating the advantageous blending result from implementation of embodiments of the disclosed technology such as the exemplary keystone correction module illustrated in FIG. 11.

FIG. 12 is a graph illustrating the advantageous blending results from the horizontal accumulation block 1108.

The horizontal accumulation block 1108 can perform scaling in the x direction and accumulate the power distribution in the x direction.

The HFIFO block 1110 can be used to buffer the horizontal accumulation results and (x, y) position, and send the results to the vertical accumulation block 1112.

The vertical accumulation block 1112 can perform vertical pre-compensation filtering and vertical accumulation. The vertical accumulation block 1112 implements the per-pixel accumulation part of the vertical scaling algorithm.

The vertical accumulation block 1112 can include a vertical pre-compensation filter that is used to perform a de-moiré operation in the vertical direction. Typically, the filter coefficients are the same as those corresponding to the horizontal pre-compensation filter.

The following exemplary registers can be used as indicated:
PRECOMP_EN (a value of 1 can enable pre-compensation filtering).
NORMBLEND_FACTOR can be used to modify the percentage to balance the brightness between zoom area and shrink area (e.g., a value of 0 means no brightness normalization, whereas a value of 16 means total brightness normalization).

The vertical accumulation block 1112 can perform vertical scaling in the y direction and accumulate the power distribution in the y direction. The vertical accumulation block can also send the accumulated data and position information to the cache operation block 1114.

The cache operation block 1114 is generally similar to the HFIFO block 1110 but more complex. The cache operation block 1114 can buffer the vertical accumulation results and save them to DDR memory. Typically, there are 8 lines buffer in cache, where the data in one line buffer may not be in the same display line (depending on the display slope). That is, each group of columns (e.g., blocks) may represent a different set of 8 adjacent lines. The limit to the amount of pincushion and keystone correction that can be applied can be set by combining the block size with the number of lines in the cache memory.

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and their associated storage media, including harddrives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An image projection system, comprising:
   a receiving component operable to receive an input image from an external source, wherein the input image has an optical distortion; and
   a controller operable to generate an inverse optical distortion responsive to the optical distortion of the input image by mapping the input image to a display device, wherein the mapping comprises:
   modeling each of the input image pixels as having a finite size; and
   determining an amount of each of the input image pixels to be mapped to a corresponding display device pixel based at least in part on distorted pixels caused by the mapping, wherein at least some of the input image pixels are mapped to more than one of the display device pixels, and wherein at least some of the display device pixels will are mapped to more than one of the input image pixels.

2. The image projection system of claim 1, wherein the controller is operable to generate the inverse optical distortion by applying two separate 1D processes to the input image.

3. The image projection system of claim 1, wherein the mapping further comprises applying a filter to the input image to remove alias frequencies.

4. The image projection system of claim 2, wherein applying two separate 1D processes to the input image comprises applying a horizontal scaling operation on the input image.

5. The image projection system of claim 4, wherein applying two separate 1D processes to the image data further comprises applying a vertical scaling operation on the input image.

6. An image projection system, comprising:
   a receiving component operable to receive an input image from an external source, wherein the input image has an optical distortion; and
   a controller operable to generate an inverse optical distortion responsive to the optical distortion of the input image by mapping the input image to a display device, wherein the mapping comprises:
   modeling each of the input image pixels as having a finite size;
   determining an amount of each of the input image pixels to be mapped to a corresponding display device pixel based at least in part on distorted pixels caused by the mapping; and
   applying two separate 1D processes to the input image, wherein the applying comprises:
   applying a horizontal scaling operation on the input image; and
   applying a vertical scaling operation on the input image, wherein the vertical scaling operation is applied after the horizontal scaling operation has begun and before the horizontal scaling operation has completed.

7. The image projection system of claim 5, wherein the controller comprises a horizontal accumulator operable to apply the horizontal scaling operation on the input image.

8. The image projection system of claim 7, wherein the controller further comprises a vertical accumulator coupled with the horizontal accumulator, wherein the vertical accumulator is operable to apply the vertical scaling operation on the input image.

9. An image projection system, comprising:
   a receiving component operable to receive an input image from an external source, wherein the input image has an optical distortion; and a controller operable to generate an inverse optical distortion responsive to the optical distortion of the input image by mapping the input image to a display device, wherein the mapping comprises:
modeling each of the input image pixels as having a finite size;
determining an amount of each of the input image pixels to be mapped to a corresponding display device pixel based at least in part on distorted pixels caused by the mapping; and
applying two separate 1D processes to the input image, wherein the applying comprises:
applying a horizontal scaling operation on the input image; and
applying a vertical scaling operation on the input image, the controller comprising:
a horizontal accumulator operable to apply the horizontal scaling operation on the input image;
a vertical accumulator coupled with the horizontal accumulator, wherein the vertical accumulator is operable to apply the vertical scaling operation on the input image; and
a memory coupled to the vertical accumulator, wherein the memory is operable to buffer and store image data outputted from the vertical accumulator.

10. The image projection system of claim 7, further comprising a pre-filtering module coupled with the horizontal accumulator, wherein output data from the pre-filtering module is provided as input data for the horizontal accumulator.

* * * * *

UNITED STATES PATENT AND TRADEMARK OFFICE
CERTIFICATE OF CORRECTION

PATENT NO. : 8,396,322 B1
APPLICATION NO. : 12/137000
DATED : March 12, 2013
INVENTOR(S) : Neil D. Woodall et al.

It is certified that error appears in the above-identified patent and that said Letters Patent is hereby corrected as shown below:

In the Specification

Column 5, lines 20-21, "$O_{i+1,j+1} w1*I_{i,j}+w2*I_{i+2,j} w4*I_{i,j+1}+w5*I_{i+1,j+1} w6*I_{i+2,j+1}$" should be replaced with -- $O_{i+1,j+1} = w1*I_{i,j} + w2*I_{i+1,j} + w3*I_{i+2,j} + w4*I_{i,j+1} + w5*I_{i+1,j+1} + w6*I_{i+2,j+1}$ --.

Column 5, Line 23, "w1=percent of $L_{i,j}$ that overlaps $O_{i+1,j+1}$" should be replaced with --w1 = percent of $I_{i,j}$ that overlaps $O_{i+1,j+1}$--.

Column 5, line 24, "w2=percent of that overlaps $O_{i+1,j+1}$" should be replaced with --w2 = percent of $I_{i+1,j}$ that overlaps $O_{i+1,j+1}$--.

Signed and Sealed this
Twentieth Day of August, 2013

Teresa Stanek Rea
*Acting Director of the United States Patent and Trademark Office*